United States Patent
Deng et al.

(10) Patent No.: US 9,934,061 B2
(45) Date of Patent: Apr. 3, 2018

(54) BLACK BOX TECHNIQUES FOR DETECTING PERFORMANCE AND AVAILABILITY ISSUES IN VIRTUAL MACHINES

(71) Applicant: International Business Machines Corporation, Armonk, NY (US)

(72) Inventors: Yu Deng, Yorktown Heights, NY (US); Ruchi Mahindru, Elmsford, NY (US); Cuong Manh Pham, Yorktown Heights, NY (US); Harigovind Ramasamy, Ossining, NY (US); Soumitra Sarkar, Cary, NC (US); Mahesh Viswanathan, Yorktown Heights, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/981,035

(22) Filed: Dec. 28, 2015

(65) Prior Publication Data
US 2017/0185436 A1    Jun. 29, 2017

(51) Int. Cl.
*G06F 9/455*    (2006.01)

(52) U.S. Cl.
CPC ............... *G06F 9/45558* (2013.01); *G06F 2009/45579* (2013.01); *G06F 2009/45591* (2013.01)

(58) Field of Classification Search
CPC .................................................. G06F 9/45558
See application file for complete search history.

(56) References Cited

U.S. PATENT DOCUMENTS

2005/0289542 A1*  12/2005  Uhlig ................. G06F 9/45533
                                                                 718/1
2010/0241785 A1*   9/2010  Chen .................... G06F 9/5016
                                                                 711/6

(Continued)

OTHER PUBLICATIONS

Hwang, Jinho, et al. "A component-based performance comparison of four hypervisors." Integrated Network Management (IM 2013), 2013 IFIP/IEEE International Symposium on. IEEE, 2013.*

(Continued)

*Primary Examiner* — Charlie Sun
(74) *Attorney, Agent, or Firm* — Ryan, Mason & Lewis, LLP

(57) ABSTRACT

Methods, systems, and computer program products for black box techniques for detecting performance and availability issues in virtual machines exploiting hardware assisted virtualization are provided herein. A computer-implemented method includes capturing multiple hardware assisted virtualization exit calls generated in connection with a given virtual machine; calculating one or more virtual machine performance metrics attributed to the given virtual machine based on the multiple hardware assisted virtualization exit calls; determining one or more virtual machine performance issues and/or one or more virtual machine availability issues attributed to the given virtual machine based on the one or more calculated virtual machine performance metrics; and outputting an alert identifying the one or more determined virtual machine performance issues and/or the one or more virtual machine availability issues attributed to the given virtual machine.

17 Claims, 3 Drawing Sheets

(56) References Cited

U.S. PATENT DOCUMENTS

| | | | | |
|---|---|---|---|---|
| 2013/0326519 A1* | 12/2013 | Anderson | ........... | G06F 9/45533 |
| | | | | 718/1 |
| 2014/0245298 A1* | 8/2014 | Zhou | ....................... | G06F 9/455 |
| | | | | 718/1 |
| 2016/0142474 A1* | 5/2016 | Itsumi | ..................... | H04L 67/10 |
| | | | | 370/390 |
| 2017/0060656 A1* | 3/2017 | Bhattacharya | ........ | G06F 11/079 |

OTHER PUBLICATIONS

Bosch, Virtualization, Lehigh University, 2010.*
Pham et al., "Reliability and Security Monitoring of Virtual Machines Using Hardware Architectural Invariants," In proceedings of the 44th International Conference on Dependable Systems and Networks (DSN) 2014.
KVM, Linux's perf-kvm, http://www.linux-km.org/page/Perf_events, Dec. 4, 2015.
Libvirt, Applications using libvirt, https://libvirt.org/apps.html, Dec. 17, 2015.
Pelleg et al., Vigilant: out-of-band detection of failures in virtual machines. SIGOPS Oper. Syst. Rev., 42(1):26-31, Jan. 2008.
Suneja et al., Exploring VM Introspection: Techniques and Trade-offs. International Conference on Virtual Execution Environments (VEE), Mar. 2015.

* cited by examiner

BLACK BOX TECHNIQUES FOR DETECTING PERFORMANCE AND AVAILABILITY ISSUES IN VIRTUAL MACHINES

FIELD

The present application generally relates to information technology, and, more particularly, to virtual machine (VM) management.

BACKGROUND

In virtualized environments, it can be challenging to monitor the state of VMs externally; that is, without embedding agents in the VMs. Additionally, customers can often be resistant to the installation of agents by a Cloud provider. Such agents utilize compute resources in the VM, and customers with privileged access can interfere with the intended functioning of the agents.

SUMMARY

In one embodiment of the present invention, black box techniques for detecting performance and availability issues in virtual machines are provided. An exemplary computer-implemented method can include steps of capturing multiple hardware assisted virtualization exit calls generated in connection with a given virtual machine; calculating one or more virtual machine performance metrics attributed to the given virtual machine based on the multiple hardware assisted virtualization exit calls; determining one or more virtual machine performance issues and/or one or more virtual machine availability issues attributed to the given virtual machine based on the one or more calculated virtual machine performance metrics; and outputting an alert identifying the one or more determined virtual machine performance issues and/or the one or more virtual machine availability issues attributed to the given virtual machine.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes black box techniques for detecting performance and availability issues in virtual machines. At least one embodiment of the invention includes hypervisor-independent black box (that is, agentless) monitoring of VMs using hardware assisted virtualization (HAV) event analysis, wherein the HAV implementation can be based, for example, on the standards defined by Intel® and Advanced Micro Devices® (AMD®). Additionally, such an embodiment can be applied to one or more Cloud implementations based on physical machines (computers) which use Intel®/AMD®-based hardware and operating systems which support the HAV standards.

In one or more embodiments of the invention, multiple VM metrics can be captured, wherein such metrics are fine-grained and directly indicative of internal VM issues. Accordingly, such embodiments of the invention include using such metrics to detect performance and availability issues of VMs.

As detailed herein, VM exit events are generated by HAV to notify hypervisors to handle guest restricted operations. Such operations can include, for example, input/output (I/O) accesses, control register (CR) accesses, etc. In the HAV architecture, a processor can operate in a guest mode or a host mode. Virtual machines operate in guest mode, and the hypervisor and host operating system operate in host mode. The guest mode is also referred to as a restricted mode, in which privileged hardware operations (such as direct execution of an I/O operation, direct modification of one or more registers, etc.) are not permitted. When a VM attempts to execute a privileged operation, the processor will suspend that VM, and raise an event, referred to as a VM exit event. The hypervisor captures this event, processes the event, and subsequently performs a VM entry operation to resume the execution of the VM. The events are generated, for example, to help the hypervisor to manage its VMs. Additionally, one or more embodiments of the invention includes leveraging such events to monitor virtual machines.

Figure 1:
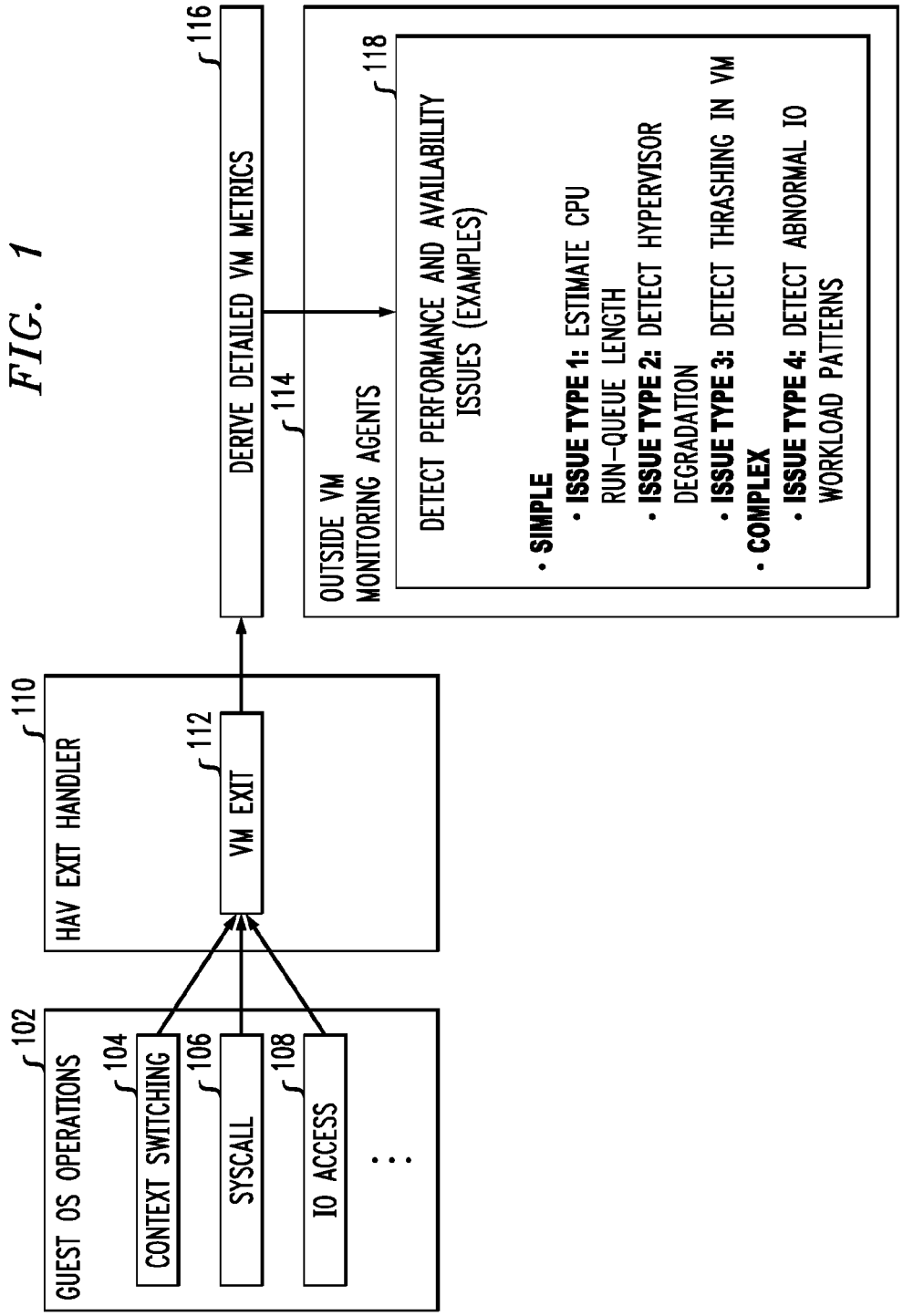
FIG. 1 is a diagram illustrating system architecture, according to one example embodiment of the invention.

FIG. 1 is a diagram illustrating system architecture, according to one example embodiment of the invention. By way of illustration, FIG. 1 depicts a guest operating system (OS) component 102, which performs various privileged hardware operations, wherein such operations can include context switching 104, system call (syscall) 106, I/O access 108, etc. Privileged hardware operations performed by the guest OS operations component 102 result in VM exit events raised by the processor with HAV support, which are captured by the VM exit handler sub-component 112 of a HAV exit handler component 110. The parameters to the VM exit handler contain information about the privileged HW operation that was executed by the VM OS, as well as the parameters to that operation.

As illustrated in FIG. 1, special exit event-intercept code is injected into the standard exit event processing code of the hypervisor, and the VM exit sub-component 112 provides information about the privileged HW operation and its parameters that caused the exit event to a VM metrics derivation component 116. Subsequently, the VM metrics derivation component 116 generates and provides one or more metrics as input to a performance and availability issue detection sub-component 118 (resident on a VM monitoring agent component 114), which uses the metrics to detect one or more issues in the VM or VMs under analysis.

Figure 2:
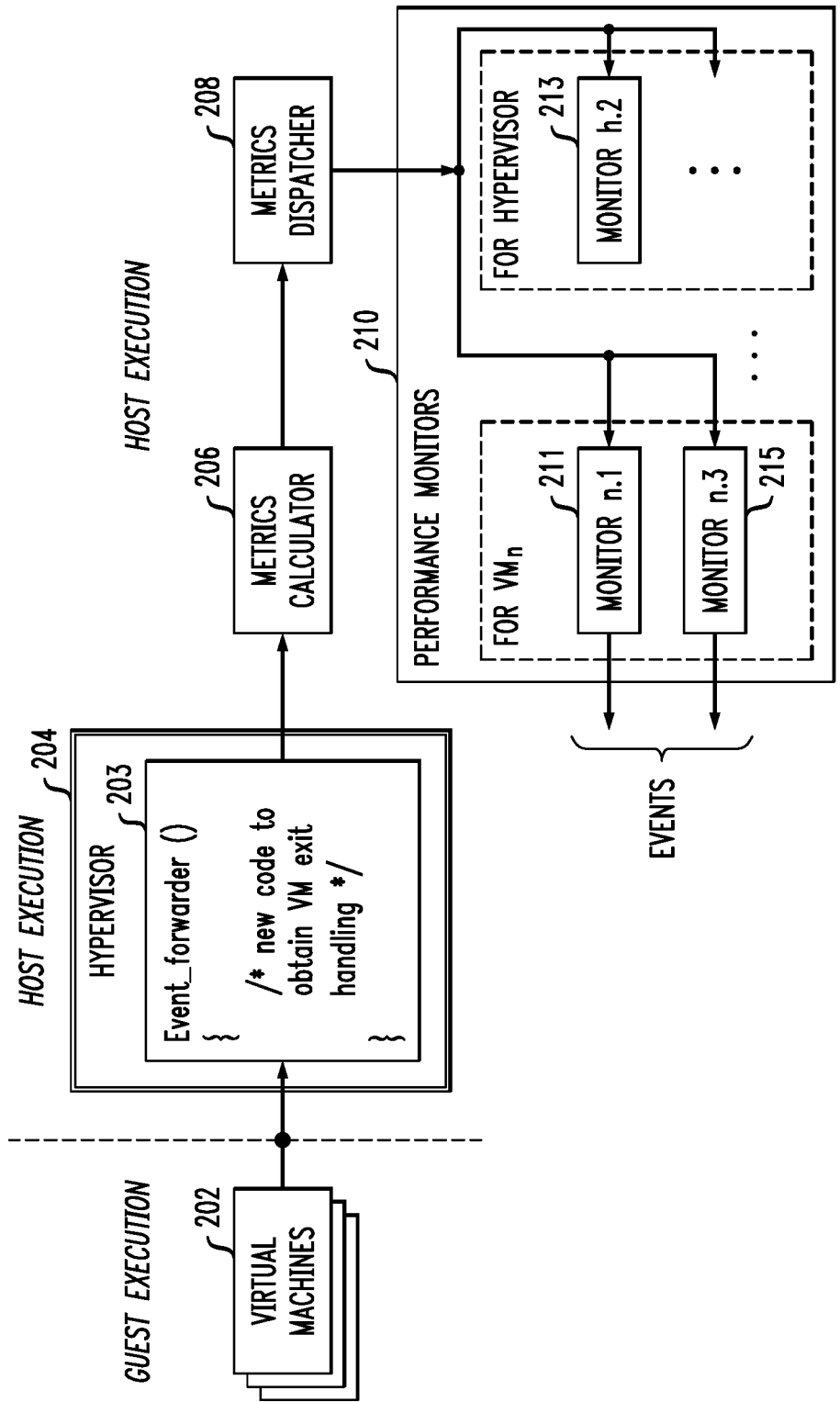
FIG. 2 is an example instance of the embodiment of the invention encompassing the system architecture depicted in FIG. 1.

Accordingly, as noted above and further detailed herein, VM exit events are intercepted by code injected into VM exit sub-component 112. The VM exit events are then passed on to the VM metrics derivation component 116. An example of the above-noted code is shown in FIG. 2 (as the Event_forwarder subroutine) inside the hypervisor 204. It is also noted that such code can be present and/or implemented in the VM exit sub-component 112.

As further detailed herein, at least one embodiment of the invention includes implementing monitoring agents (such as component 114 in FIG. 1, for example), external to a VM, to analyze VM exit events. Based on the event types representing different hardware operations and their parameters, and the current state of the related hardware, such an embodiment can further include inferring the current activities of the VM. From this inference, one or more embodiments of the invention include deriving VM-internal performance metrics (via component 116 in FIG. 1, for example). Analytic techniques can then be applied (via component 118 in FIG. 1, for example) on the derived metrics to detect one or more specific VM performance issues. Example issues, as described further herein, can include central processing unit (CPU) run-queue length, hypervisor degradation, thrashing in the VM, abnormal I/O workload patterns, etc. It should be noted that these example issues are, indeed, merely examples, and it is to be appreciated by one skilled in the art that other issues in customer VMs can be detected via the HAV event interception mechanism described herein.

As used here, "thrashing" refers to the phenomenon of too much paging occurring in operating systems which support virtual memory to logically extend the amount of physical memory available in a computer for applications. When the amount of physical memory available is too small as compared to the memory requirements and/or demands of different applications that are to be run on the computer, the operating system spends time paging out the contents of the physical memory to a disk (virtual memory) for an application being unscheduled, and paging in the contents of physical memory from the disk for an application being scheduled, potentially resulting in too much time being spent in disk I/O as compared to the time spent in executing the applications themselves.

FIG. 2 an example instance of the embodiment of the invention encompassing the system architecture depicted in FIG. 1, wherein the $n^{th}$ VM is being monitored for example issue 1 (CPU run-queue length) and example issue 3 (thrashing in the VM), while the hypervisor is being monitored for example issue 2 (hypervisor degradation). By way of illustration, FIG. 2 depicts a guest execution section of implementation and a host execution section of implementation. The guest execution section includes one or more VMs 202. The host execution section includes a hypervisor 204, a metrics calculator component 206, a metrics dispatcher component 208, and a set of performance monitors 210, which includes one or more monitoring agents such as monitoring agent 211, which detects one type of issue in the $n^{th}$ VM, monitoring agent 213, which detects a different type of issue in the hypervisor, and monitoring agent 215, which detects a different type of issue in the $n^{th}$ VM. FIG. 2 also depicts code 203, resident within the hypervisor 204, which contains an Event_forwarder( ) subroutine which intercepts the VM exit events and passes them on to the metrics calculator 206.

One or more embodiments of the invention can include modifying hypervisor 204 to obtain and/or intercept VM exits and forward the VM exits to the metrics calculator component 206. As detailed herein, execution of a privileged hardware operation in guest mode by a VM results in the hardware processor itself generating an exit event. The hypervisor already contains a special subroutine in its implementation (code) which will be invoked by the hardware when the hardware raises the exit event and wants the exit event to be handled. Modifying the hypervisor 204, as noted above, refers to code being inserted in the existing hypervisor's subroutine to process the exit event in order to intercept the exit event (see the Event_forwarder routine 203 in hypervisor 204; that is the new event interception code utilized by one or more embodiments of the invention) and pass on the details about the hardware operation and its parameters (which generated the exit event) to the metrics calculator component 206.

The metrics calculator component 206 computes one or more performance metrics based on the obtained VM exits, and sends the computed performance metrics to the metric dispatcher component 208. The metric dispatcher component 208 delivers related metrics values to each of the performance (issue) monitoring agents (agents 211, 213 and 215) within the set of performance monitors 210. The metrics calculator 206 calculates the VM metrics values using the VM exit information obtained from the Event_forwarder interceptor subroutine 203. These calculated metrics are passed on to the dispatcher component 208, which then forwards the VM metrics to the appropriate performance (issue) monitors instantiated for each VM. In at least one embodiment of the invention, each performance monitoring agent implements a single analytical technique on a single VM and detects one or more performance issues related to that VM.

Additionally, it should be noted that monitors 211, 213, and 215 in FIG. 2 are specialized for detecting performance issues. Each monitor implements some type of analytics technique to carry out the specialized detection task(s).

As noted herein, in one or more embodiments of the invention, various metrics can be calculated in furtherance of detecting VM performance and/or availability issues. Example metrics, each derivable from VM exit events, utilized in such embodiments of the invention can include (1) a VM exit frequency metric, (2) a hypervisor response time (HRT) metric, (3) a metric pertaining to the number of active processes over a chosen period of time, (4) a metric pertaining to the number of active threads in each process and/or time window, (5) I/O-related metrics, and (6) memory-related metrics. Such example metrics are described in additional detail below.

As noted above, one or more embodiments of the invention can include implementing a VM exit frequency metric. Input for such a metric includes all obtained and/or recorded VM exits over a given time window (such as, for example, one minute, five minutes, etc.). Computing this metric includes counting the number of VM exits, and dividing that number by the given time window, generating an output of the VM exit frequency.

As also noted above, one or more embodiments of the invention can include implementing an HRT metric that considers the average time taken by the hypervisor to process a VM exit event. Input for calculating such a metric includes all VM exits over a given time window. Computing this metric includes measuring the amount of time spent in the hypervisor for each type of VM exit event, over the time window. This metric reflects the virtualization overhead of the hypervisor for each (type of) VM exit event, and the generated output includes the average time taken to process a given VM exit event, for each type of VM exit event.

Additionally, as noted above, one or more embodiments of the invention can include implementing a metric pertaining to the number of active processes over a chosen period of time (time window). Input for such a metric includes a CR access VM exit, and computing this metric includes using the value of the CR3 register as an identifier of a user process (PID) in the VM, and using that information to estimate the number of active processes in the VM. Each time the VM needs to modify the value of the CR3 register (for example, for context switching), the hardware generates a CR access VM exit event to notify the hypervisor. The metrics calculator uses the identifier of a user process in the VM that causes the exit event, and counts the number of active process IDs in the VM over a given time period to estimate the number of active processes in the VM. Accordingly, the output of this metric calculating is an estimate of the number of active (created or otherwise) processes on each VM.

As additionally noted above, one or more embodiments of the invention can include implementing a metric pertaining to the number of active threads in each process and/or time window. Input for such a metric includes identifying extended page table (EPT) violations. As used herein, a page table refers to an operating system construct used to implement virtual memory. An EPT refers to a type of page table. In computing this metric, it is noted that VM task switching is not caught by monitoring CR access exits. As such, the task state segment (TSS) structure for a virtual CPU is allocated in a read-only extended page table area by the hypervisor. Accordingly, computing this metric includes counting EPT violation exits, as well as noting related PIDs in CR3, wherein such values can be used to estimate (i) thread and/or process duration, and (ii) the top-k CPU dominant threads and/or processes. Therefore, the output of this metric includes an estimated number of scheduled threads in each process, per time window (in the order of minutes, for example) by examining the number of running threads in the time window, over multiple time windows.

Further, as noted above, one or more embodiments of the invention can include implementing one or more I/O-related metrics. Input for such metrics can include I/O instruction events, external interrupt events, and EPT violation events. As used herein, an external interrupt is a fundamental hardware mechanism by which an external device (such as, for example, a network interface card, a disk drive, a timer chip, etc.) informs the CPU that there is input data to be processed (for example, a network packet has arrived on an Ethernet card), or an event to be processed (for example, the timer chip generates a periodic timer tick event). In at least one embodiment of the invention, computing such metrics includes carrying out the following sequence of three steps (in the noted sequence):

(i) (Associated with a VM process; carried out mostly by kernel): An I/O instruction event notifies the hypervisor that a guest VM is attempting to execute an I/O instruction (for example, I/O read, I/O write, etc.). The port address indicates the device used, and by reading the CR3 register, one or more embodiments of the invention can include identifying which process in the VM executed the instruction.

(ii) (Kernel only): An external int event notifies the hypervisor that a guest VM is about to receive an interrupt (for example, a keystroke interrupt from a peripheral device).

(iii) (Associated with a VM process; carried out mostly by kernel): Accesses to a memory-mapped I/O (MMIO) address region will trigger EPT violation events if the MMIO address region is in read-only pages.

With full virtualization, every I/O operation will access the MMIO address space. With paravirtualization, the driver is aware of the VM environment and performs a virtualization standard (such as VirtIO, for example) in cooperation with the hypervisor and batches I/O operations to reduce the number of VM exits (EPT violation events, for example).

Accordingly, the output generated by the above-detailed I/O-related metrics can include: the number of MMIO reads/writes per process in the VM, as well as I/O length, latency, and inter-arrival time between inbound I/O units, each in fixed time windows of choice (for example, one minute).

As also noted above, one or more embodiments of the invention can include implementing memory-related metrics. Input for such metrics can include exception exits (including a number related thereto) and EPT violation exits. As used herein, an exception exit event can be triggered by a page fault caused by the VM OS. Additionally, in connection with such metrics, allocated and/or de-allocated memory size can be associated with a process, and (virtual) memory reads/writes and page fault rates can be associated with a process. Further, computing memory-related metrics can include the following steps. When a VM OS triggers a page fault, the hypervisor will obtain an exception exit with a specific exception number. Also, an EPT can be used to monitor the physical memory usage of VMs, wherein an EPT is a hardware support mechanism for efficient memory management in the hypervisor. The EPT helps, for example, to eliminate the shadow paging mechanism previously used by hypervisors. When the VM OS attempts to allocate new guest memory, the VM OS has to access a read-only page table, resulting in an EPT violation exit. Further, both of the above-noted events (exception exits and EPT violation exits) can be associated with a PID using the CR3 register.

As detailed herein, in addition to computing one or more metrics (such as the example metrics described above), one or more embodiments of the invention also include utilizing such metrics to detect one or more VM performance and/or VM availability issues. As also noted in connection with FIG. 1 above, example issue types can include (1) the CPU run-queue length of a VM being too high, indicating insufficient CPU resources allocated to the VM, (2) hypervisor degradation, (3) thrashing in the VM, indicating insufficient memory resources allocated to the VM, and (4) abnormal I/O workload patterns. Such example issue types are described in additional detail below.

Issue type 1, CPU run-queue length of a VM, can include inputs of metric 3 as noted above (the metric pertaining to the number of active processes over a chosen period of time) and metric 4 as noted above (the metric pertaining to the number of active threads in each process and/or time window). In connection with detecting this issue type, it is noted that a thread is a unit of scheduling (bound to a core). Using metric 3 and metric 4, one or more embodiments of the invention can include estimating the average run queue length of a VM. Note that a larger average run queue length indicates that CPU resources are insufficient.

Additionally, one or more embodiments include counting, in a given time window T, how many different threads in a VM have been run on a core. Such an embodiment can further include estimating the run queue length by counting the number of active and distinct threads in window T. Also, in such an embodiment, T can be large, such as, for example, one minute, assuming a task is scheduled on the relevant core for a maximum of 100 milliseconds (msecs).

One or more embodiments of the invention can also include assuming that every thread seen in a time window T was executable or running across the entire time period T. Refinement can be implemented in one or more embodiments of the invention by looking across multiple time windows. By way of illustration, a thread T1 may only occur in one time window and never be seen in subsequent time windows. Accordingly, one or more embodiments of the invention can include averaging this value over multiple time windows as an average run queue length. If the computed average is greater than a predetermined threshold, such an embodiment can include generating an alert. By way of example, the threshold can be based on the number of virtual CPUs on the given VM.

Issue type 2, hypervisor degradation, can include an input of metric 2 as noted above (the HRT metric). Detecting such an issue type includes a training phase and a detection phase. The training phase includes generating a profile for HRT for handling each type of HAV event. Additionally, a benchmark can be set and/or determined with respect to HRT to be used for comparison across multiple instances. The detection phase can include identifying instances wherein the time taken by the Hypervisor to handle VM exit requests (HRT) being outside of an expected range within a given time window. Such an instance is an indicator of performance degradation. Additionally, one or more embodiments of the invention can include using time series data (for example, the average HRT per VM exit in a fixed time quanta) to detect one or more anomalies (for example, by constructing an autoregressive integrated moving average (ARIMA) model using past HRT values for a given VM exit, predicting the next N HRT values using the model, comparing the predicted values to the actual values and declaring an anomaly if a (significant) discrepancy is found), and correlating the one or more anomalies to specific VM exits to determine the VMs that are root causes. Such an embodiment can further include generating and outputting an alert when an anomaly is detected, wherein such an alert indicates performance degradation of the VM.

Issue type 3, thrashing in the VM, can include an input of metric 6 as noted above (the one or more memory-related metrics, including at least VM page faults). Accordingly, the paging rate of a given VM is calculated via metric 6, and one or more embodiments of the invention can include comparing the paging rate of the given VM with that of other VMs running on the hypervisor to identify VMs with outlier paging rates as anomalous. Alternatively one or more embodiments of the invention can include storing one or more benchmarks of paging rates of properly (memory) provisioned VMs running different workloads in a "training" phase, and using the benchmark rates to detect an abnormally high paging rate in a VM (and correspondingly raising an alert). As such, a generated output related to detecting issue type 3 can include alerts identifying excessive paging in a VM, which can be a sign of memory under-provisioning in the VM.

Issue type 4, abnormal I/O workload patterns, can include an input of metric 5 (the one or more I/O-related metrics) for MMIO patterns associated with a given VM. Detecting such an issue type can include a training phase and a run-time phase. In the training phase, at least one embodiment of the invention can include obtaining time series data of I/O read/write metrics generated by a VM during an "active" period of I/O activity. Additionally, one or more embodiments of the invention include utilizing an assumption that a single VM runs a single type of workload with a trainable I/O pattern (for example, as a time series model).

By way of illustration, each application typically includes alternate "compute" and "I/O" phases. That is, the application: (1) performs some computation, (2) reads or writes data, and (3) repeats these steps. The active period is basically step (2) in the above loop abstraction of any application. The time series data can include, for example, example metric 5, which contains counts (and other metrics) of I/Os in fixed time windows (for example, one minute). As an application executes in a VM, metric 5 can compute, for example, the number of I/O operations performed by the application in the VM every minute. Each I/O operation count in one minute is the time series data. The simplifying assumption is that each VM is only running one application that is generating the bulk of the I/O operations in the VM (note that the VM OS also generates I/O operations such as to implement paging).

In the run-time phase, at least one embodiment of the invention can include utilizing the trained time series model (for example, ARIMA) and a "new I/O activity" pattern to detect one or more anomalies over a given period of time. This involves using the trained time series model to predict the next N values (of the number of I/O operations in a given time window), comparing the values to the measured values, and declaring an anomaly if the measured values differ significantly from the model values. One or more embodiments of the invention can additionally include building "normal workload" signatures based on one or more types of signal processing techniques, and declaring an anomaly if the actual measured values of the I/O operation counts in fixed time windows differ significantly from the ones predicted by the signatures. As such, a generated output related to detecting issue type 4 can include the identification of one or more anomalous workload patterns.

Figure 3:
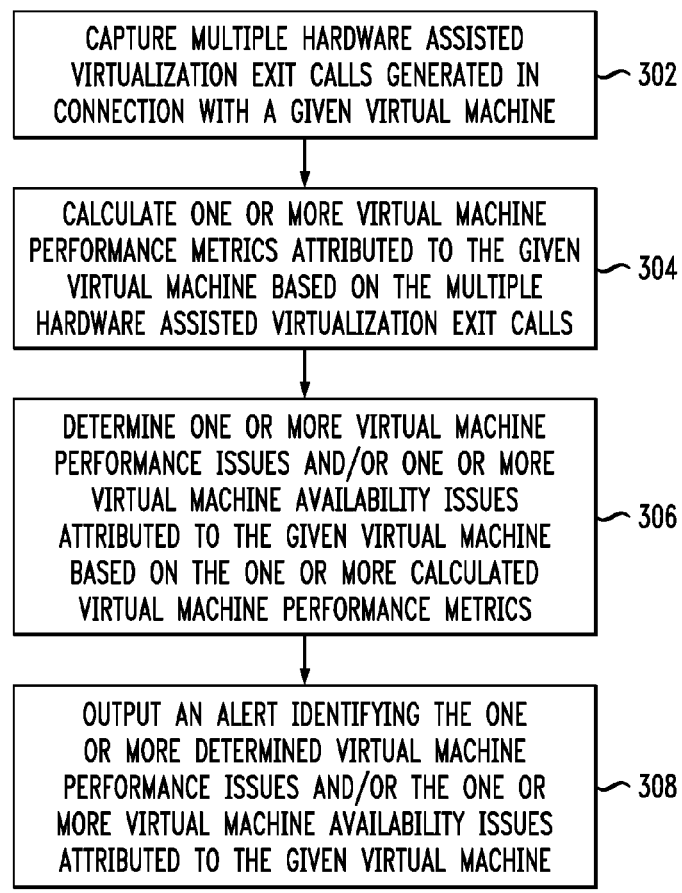
FIG. 3 is a flow diagram illustrating techniques according to an embodiment of the invention.

FIG. 3 is a flow diagram illustrating techniques according to an embodiment of the present invention. Step 302 includes capturing multiple hardware assisted virtualization exit calls generated in connection with a given virtual machine. The capturing step can be carried out by implementing an extension to the VM exit event handler subroutine implemented by the hypervisor to intercept the VM exit calls and forwarding them to a metrics detection module. The base VM exit handler in the hypervisor is assumed to already exist, because the hypervisor has to implement such a subroutine to process the VM exit events generated by the)(Intel®)/AMD® hardware operations in order to implement virtualization using HAV.

Step 304 includes calculating one or more virtual machine performance metrics attributed to the given virtual machine based on the multiple hardware assisted virtualization exit calls. As detailed herein, the one or more virtual machine performance metrics attributed to the given virtual machine can include (i) a virtual machine exit frequency metric, (ii) a hypervisor response time metric, (iii) a metric pertaining to a number of active processes on the given virtual machine over a predefined period of time, (iv) a metric pertaining to a number of active threads in each process on the given virtual machine and/or over a predefined period of time, (v) one or more input/output-related metrics, and/or (vi) one or more memory-related metrics.

Step 306 includes determining one or more virtual machine performance issues and/or one or more virtual machine availability issues attributed to the given virtual machine based on the one or more calculated virtual machine performance metrics. As also detailed herein, the one or more virtual machine performance issues and/or one or more virtual machine availability issues attributed to the given virtual machine can include (i) an issue pertaining to central processing unit run-queue length of the given virtual machine, (ii) an issue pertaining to hypervisor degradation in relation to the given virtual machine, (iii) an issue pertaining to thrashing in the given virtual machine, and/or (iv) an issue pertaining to one or more abnormal input/output workload patterns in the given virtual machine.

Step 308 includes outputting an alert identifying the one or more determined virtual machine performance issues and/or the one or more virtual machine availability issues attributed to the given virtual machine.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives HAV exit call information sent from a data source to the transmission server. The server can process the information, for example, based upon user-provided user preference information that is stored in memory on the server. Subsequently, an alert is generated containing a detected issue based on the HAV exit call information and one or more derived metrics. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
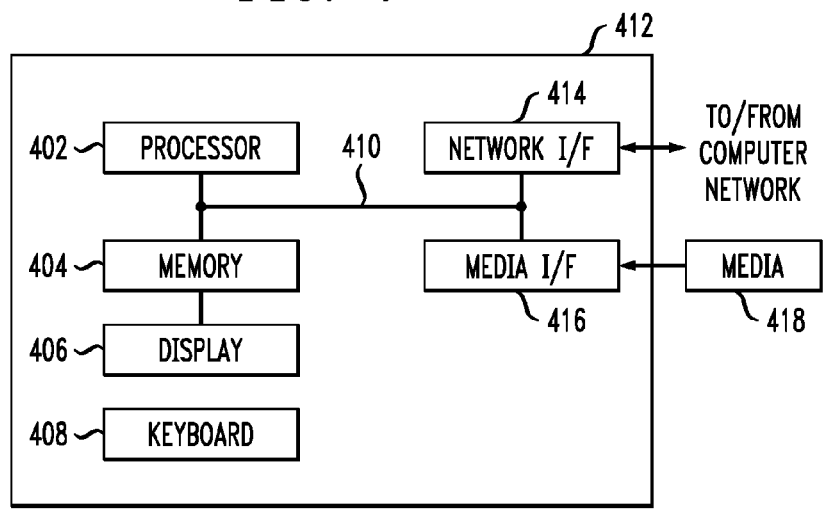
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, enabling selection of the level of granularity in which replication is carried out among given VMs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    capturing multiple hardware assisted virtualization exit calls generated in connection with a given virtual machine, wherein said capturing comprises:
        implementing an extension to a virtual machine exit event handling subroutine of a hypervisor that is capable of implementing virtualization using hardware assisted virtualization, wherein the extension provides instructions to intercept one or more virtual machine exit events; and forwarding the one or more virtual machine exit events to a virtual machine metrics calculation module;
    calculating one or more virtual machine performance metrics attributed to the given virtual machine based on the multiple hardware assisted virtualization exit calls;
    determining one or more virtual machine performance issues and/or one or more virtual machine availability issues attributed to the given virtual machine based on the one or more calculated virtual machine performance metrics; and
    outputting an alert identifying the one or more determined virtual machine performance issues and/or the one or more virtual machine availability issues attributed to the given virtual machine;
    via the alert, connecting to a data source for additional information by a remote user computer;
    wherein the steps are carried out by at least one computing device.

2. The computer-implemented method of claim 1, wherein the one or more virtual machine performance metrics attributed to the given virtual machine comprise a virtual machine exit frequency metric.

3. The computer-implemented method of claim 1, wherein the one or more virtual machine performance metrics attributed to the given virtual machine comprise a hypervisor response time metric.

4. The computer-implemented method of claim 1, wherein the one or more virtual machine performance metrics attributed to the given virtual machine comprise a metric pertaining to a number of active processes on the given virtual machine over a predefined period of time.

5. The computer-implemented method of claim 1, wherein the one or more virtual machine performance metrics attributed to the given virtual machine comprise a metric pertaining to a number of active threads in each process on the given virtual machine and/or over a predefined period of time.

6. The computer-implemented method of claim 1, wherein the one or more virtual machine performance metrics attributed to the given virtual machine comprise one or more input/output-related metrics.

7. The computer-implemented method of claim 1, wherein the one or more virtual machine performance metrics attributed to the given virtual machine comprise one or more memory-related metrics.

8. The computer-implemented method of claim 1, wherein the one or more virtual machine performance issues and/or one or more virtual machine availability issues attributed to the given virtual machine comprise an issue pertaining to central processing unit run- queue length of the given virtual machine.

9. The computer-implemented method of claim 1, wherein the one or more virtual machine performance issues and/or one or more virtual machine availability issues attributed to the given virtual machine comprise an issue pertaining to hypervisor degradation in relation to the given virtual machine.

10. The computer-implemented method of claim 1, wherein the one or more virtual machine performance issues and/or one or more virtual machine availability issues attributed to the given virtual machine comprise an issue pertaining to thrashing in the given virtual machine.

11. The computer-implemented method of claim 1, wherein the one or more virtual machine performance issues and/or one or more virtual machine availability issues attributed to the given virtual machine comprise an issue pertaining to one or more abnormal input/output workload patterns in the given virtual machine.

12. A computer program product comprising a computer readable storage medium having program instructions embodied therewith, the program instructions executable by a device to cause the device to:
    capture multiple hardware assisted virtualization exit calls generated in connection with a given virtual machine, wherein said capturing comprises:
        implementing an extension to a virtual machine exit event handling subroutine of a hypervisor that is capable of implementing virtualization using hardware assisted virtualization, wherein the extension provides instructions to intercept one or more virtual machine exit events; and
        forwarding the one or more virtual machine exit events to a virtual machine metrics calculation module;
    calculate one or more virtual machine performance metrics attributed to the given virtual machine based on the multiple hardware assisted virtualization exit calls;
    determine one or more virtual machine performance issues and/or one or more virtual machine availability issues attributed to the given virtual machine based on the one or more calculated virtual machine performance metrics; and
    output an alert identifying the one or more determined virtual machine performance issues and/or the one or more virtual machine availability issues attributed to the given virtual machine;
    via the alert, connecting to a data source for additional information by a remote user computer.

13. The computer program product of claim 12, wherein the one or more virtual machine performance metrics attributed to the given virtual machine comprise (i) a virtual machine exit frequency metric, (ii) a hypervisor response time metric, (iii) a metric pertaining to a number of active processes on the given virtual machine over a predefined period of time, (iv) a metric pertaining to a number of active threads in each process on the given virtual machine and/or over a predefined period of time, (v) one or more input/output-related metrics, and/or (vi) one or more memory-related metrics.

14. The computer program product of claim 12, wherein the one or more virtual machine performance issues and/or one or more virtual machine availability issues attributed to the given virtual machine comprise (i) an issue pertaining to central processing unit run-queue length of the given virtual machine, (ii) an issue pertaining to hypervisor degradation in relation to the given virtual machine, (iii) an issue pertaining to thrashing in the given virtual machine, and/or (iv) an issue pertaining to one or more abnormal input/output workload patterns in the given virtual machine.

15. A system comprising:
a memory; and
at least one processor coupled to the memory and configured for:
capturing multiple hardware assisted virtualization exit calls generated in connection with a given virtual machine, wherein said capturing comprises:
implementing an extension to a virtual machine exit event handling subroutine of a hypervisor that is capable of implementing virtualization using hardware assisted virtualization, wherein the extension provides instructions to intercept one or more virtual machine exit events, and
forwarding the one or more virtual machine exit events to a virtual machine metrics calculation module;
calculating one or more virtual machine performance metrics attributed to the given virtual machine based on the multiple hardware assisted virtualization exit calls;
determining one or more virtual machine performance issues and/or one or more virtual machine availability issues attributed to the given virtual machine based on the one or more calculated virtual machine performance metrics; and
outputting an alert identifying the one or more determined virtual machine performance issues and/or the one or more virtual machine availability issues attributed to the given virtual machine;
via the alert, connecting to a data source for additional information by a remote user computer.

16. The system of claim 15, wherein the one or more virtual machine performance metrics attributed to the given virtual machine comprise (i) a virtual machine exit frequency metric, (ii) a hypervisor response time metric, (iii) a metric pertaining to a number of active processes on the given virtual machine over a predefined period of time, (iv) a metric pertaining to a number of active threads in each process on the given virtual machine and/or over a predefined period of time, (v) one or more input/output-related metrics, and/or (vi) one or more memory-related metrics.

17. The system of claim 15, wherein the one or more virtual machine performance issues and/or one or more virtual machine availability issues attributed to the given virtual machine comprise (i) an issue pertaining to central processing unit run-queue length of the given virtual machine, (ii) an issue pertaining to hypervisor degradation in relation to the given virtual machine, (iii) an issue pertaining to thrashing in the given virtual machine, and/or (iv) an issue pertaining to one or more abnormal input/output workload patterns in the given virtual machine.

* * * * *